(12) United States Patent
Kang

(10) Patent No.: US 7,590,180 B2
(45) Date of Patent: Sep. 15, 2009

(54) DEVICE FOR AND METHOD OF ESTIMATING MOTION IN VIDEO ENCODER

(75) Inventor: Jung-Sun Kang, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/049,069

(22) Filed: Mar. 14, 2008

(65) Prior Publication Data

US 2008/0205526 A1    Aug. 28, 2008

Related U.S. Application Data

(62) Division of application No. 10/730,237, filed on Dec. 8, 2003, now Pat. No. 7,362,808.

(30) Foreign Application Priority Data

Dec. 9, 2002    (KR) .............................. 2002-77743

(51) Int. Cl.
   *H04N 7/12*    (2006.01)
(52) U.S. Cl. ............. 375/240.16; 375/240; 375/240.01; 375/240.12

(58) Field of Classification Search ................. 375/240, 375/240.01, 240.12, 240.16
See application file for complete search history.

(56) References Cited

U.S. PATENT DOCUMENTS 6,765,965 B1 *    7/2004    Hanami et al. .......... 375/240.16

* cited by examiner

*Primary Examiner*—Allen Wong
(74) *Attorney, Agent, or Firm*—F. Chau & Associates, LLC

(57) ABSTRACT

A motion estimator and an estimation method for a video encoder to reduce power consumption by reducing the computational complexity of the motion estimator. In an upper step, a full search for a ±4 pixel search region for a 4×4 pixel block is performed at ¼ video resolution, to detect two motion vector candidates. In a medium step, a partial search for two vector candidates selected in the upper step and one vector candidate using a spatial correlation is performed for a 8×8 block within a ±1 or ±2 search region, to decide one motion vector candidate. In a lower step, a partial search for the ±1 or ±2 search region on 16×16 block is performed at full resolution, and a half pixel search for a motion vector candidate obtained in the lower step is performed to estimate a final motion vector. A ±4 pixel search region is operatively divided into four search regions, and the estimator sequentially searches the four ±2 pixel search regions to sequentially output SAD values.

5 Claims, 8 Drawing Sheets

DEVICE FOR AND METHOD OF ESTIMATING MOTION IN VIDEO ENCODER

CROSS-REFERENCE TO RELATED APPLICATION

This application is a divisional of application Ser. No. 10/730,237 filed Dec. 8, 2003, now U.S. Pat. No. 7,362,808 which claims foreign priority under 35 U.S.C. § 119 to Korean Patent Application No. 2002-77743, filed on Dec. 9, 2002, in the Korean Intellectual Property Office, the disclosure of which is incorporated by reference herein in its entirety.

TECHNICAL FIELD

The present invention relates to video compression, and more particularly, to method and apparatus for the computationally efficient estimation of movement in video signals.

BACKGROUND

When video data is transmitted in real-time, it is desirable to send as little data as possible. Data-reducing, coding/decoding of digital video signals is, in many cases, based on a motion-compensated interpolation of picture element values (interframe coding). For this purpose, movement vectors or displacement vectors are required for picture element (pixel) blocks. These movement vectors are normally generated in the encoder by means of movement estimation. A system for processing motion video information generally employs a video encoder. The video encoder estimates motion within a video signal to process the video signal.

Motion estimation is a very important process in a standard video encoder, such as H.263 and MPEG-4 etc., for obtaining a high video-compression rate by removing elements that repeat between adjacent frames. A motion-compensation technique predicts a video signal most similar to an input video signal from a previous frame through a motion estimation technique, and to convert and encode a difference between the predicted video signal and the input video signal.

A video sequence is divided into group of frames, and each group can be composed of a series of single frames. Each frame is roughly equivalent to a still picture, with the still pictures being updated often enough to simulate a presentation of continuous motion. A frame is further divided into macroblocks. In H.26P and MPEG-X standards, a macroblock is made up of 16 by 16 luma pixels and a corresponding set of chroma pixels, depending on the video format. A macroblock (MB) has an integer number of blocks, with the 8 by 8 pixel matrix being the smallest coding unit.

Video compression is a critical component for any application which requires transmission or storage of video data. Compression techniques compensate for motion by reusing stored information in previous frames (temporal redundancy). Compression also occurs by transforming data in the spatial domain to the frequency domain. Hybrid digital video compression, exploiting temporal redundancy by motion compensation and spatial redundancy by transformation, such as Discrete Cosine Transform (DCT), has been adapted in H.26P and MPEG-X international standards.

Motion estimation is used to reduce the flow of transmitted data. Motion estimation is performed over two frames, the current frame to be encoded and the previous coded frame, also called reference frame, to derive video data matching between the two frames. In practice, video compression, including motion estimation, is carried out macroblock-wise (a whole macroblock at a time), to facilitate hardware and software implementations. Motion estimation is performed for each macroblock using a 16 by 16 matrix of luma pixels. (Handling just luma pixels simplifies procedures, and the human visual system has a higher sensitivity to luminance changes over color changes). The goal of motion estimation, for each macroblock, is to find a 16 by 16 data area in the previous frame which best represents the current macroblock. For a macroblock in the current frame, the best matching area in the last frame is used as the prediction data for the current macroblock, while the prediction error, the residue after subtracting the prediction from the macroblock data, is removed of temporal data redundancy. Temporal redundancy refers to the part of the current frame data that can be predicted from the previous frame. The removal of redundancy, or subtracting prediction values, eliminates the need to encode the repeated part of the data.

In several algorithms for motion estimation, a block matching algorithm (BMA) is most frequently used because the BMA is comparatively simple in a calculation. The BMA is a method of searching a block most similar to a current block from a search region of a previous frame. A full search block matching algorithm (FSBMA) as a basic method is optimum from an aspect of performance, but this algorithm is highly computing intensive and requires the use of special-purpose architectures to obtain real-time performance. Therefore, a high-speed algorithm such as a hierarchical search block matching algorithm (HSBMA) is used, in which motion estimation is performed by dividing an input video frame and a previous video frame into several resolutions. The HSBMA is a technique that a motion vector candidate of a large scale is obtained from a video frame at a low resolution and an optimum motion vector is then searched from within a video frame of a higher resolution. A multi-resolution search using multiple candidate and spatial correlation of motion field (MRMCS) is a high-speed hierarchical search block matching algorithm for an efficient motion estimation together with an advantage of realizing a hardware of the HSBMA.

A technique for the MRMCS algorithm is classified into upper, medium and lower steps based on the understanding that the resolution of the video is lowered in each step. About 90% of the calculation amount for the motion estimation is used in the medium and lower steps.

To estimate such a motion, a method of recovering damaged data within one frame of a motion video is disclosed in U.S. Pat. No. 5,598,226, in which a motion is estimated by searching for a block of a previous frame corresponding to a block of a current frame, and the HSBMA is provided as a method of calculating a mean absolute error (MAE) of one block of a current frame and peripheral blocks of its corresponding previous frame, and of comparing the MAE with a predetermined threshold value. That is, MAE0 is first calculated for blocks of the same position in a lower resolution video, and this MAE0 is compared with the threshold value. If its comparison result is smaller than the threshold value, it is decided there is no motion, or the MAE is calculated for the peripheral blocks to obtain a minimum MAE (MAEmin); and if the obtained minimum MAE (MAEmin) is greater than the calculated MAE0, it is decided as no motion. Then, a motion vector corresponding to the minimum MAE (MAEmin) is decided as a candidate of a next step to search a final motion vector through the same procedure in a higher video resolution.

Further, a method of estimating a motion by using a pixel difference classification (PDC) is disclosed in U.S. Pat. No. 5,200,820, in which a threshold value is predetermined, and a difference of pixels is compared with the threshold value in each of blocks within a search region of a previous frame on a corresponding block of a current frame, so as to discriminate a matching or mismatching. And then, a sum obtained by applying such a value to all pixels of a corresponding block selects the largest block for the total search points to thus estimate a motion.

An adaptive step size motion estimation algorithm based on a statistical SAD (Sum of Absolute Differences) is disclosed in U.S. Pat. No. 6,014,181, in which a step size is varied by using a statistical distribution of an SAD of previous frames, instead of a fixed step size used in a TSS (Three Step Search) algorithm to improve a motion estimating speed.

The sum of absolute difference (SAD) is an effective and widely adapted criteria to provide an accurate representation to relate motion estimation with coding efficiency. For the macroblock at (x, y) position, the SAD value between the current macroblock and a 16 by 16 block in the previous frame offset by (vx, vy) is $$SAD(vx, vy) = \sum_{j=0}^{15} \sum_{i=0}^{15} |p(x+i, y+j) - q(x+i+vx, y+j+vj)|$$ [SAD Equation]

where, p(x+i, y+j) is a pixel value in the current macroblock of the current frame, q(x+i+vx, y+j+vy) is a pixel value in the previous frame, in a 16 by 16 (i.e., 16×16) block that is offset by (vx, vy) from the current macroblock. The summation indices i and j cover the area of the macroblock. If SAD(vx, vy) is the minimum in the pre-specified search range, then (vx, vy) is the motion vector for the macroblock. The motion estimation search range (M, N) is the maximum of (vx, vy), defining a window of data in the previous frame containing macroblock-sized matrices to be compared with the current macroblock. To be accurate, the search window must be large enough to represent motion. On the other hand, the search range must be limited for practical purpose due to high complexity involved in the computation of motion estimation.

FIG. 2 is a drawing illustrating the spatial relationship between the macroblock in the current frame and search window in the previous frame (prior art). If motion vector range is defined to be (M, N), then the search window size is (16+2M, 16+2N). For TV or movie sequences, the motion vector range needs to be large enough to accommodate various types of motion content. For video conferencing and videophone applications, the search range can be smaller. Therefore, the choice of search range is a combination of application and availability of deliverable technology. Given a motion estimation search range, the computational requirement is greatly affected by the exact method of covering the search window to obtain motion vectors. An exhaustive search technique, full motion estimation search, covers all the candidate blocks in the search window to find the best match. In this case, it requires (2M+1).times (2N+1) calculations of the cost function to obtain motion vector for each macroblock. This computation cost is prohibitive for software implementations.

Such a motion estimation method may repair the damaged data to increase the resolution of video blocks and overall video encoding speed as compared with the fixed step size, however, the motion estimation for all macroblocks requires the performance of much calculation, which also causes a prolonged operating time of a motion estimator and much power consumption.

SUMMARY OF THE INVENTION

The present invention provides a motion estimator of a video encoder and a motion estimation method, which is capable of reducing the operating time of the motion estimator and its power consumption by varying a search region for a partial search of medium and lower steps in an MRMCS algorithm and by thereby, substantially, reducing the amount of calculation required for a motion estimation.

One aspect of the present invention provides a motion estimator of a video encoder, comprising: a search region data memory for storing video data of a previous video frame; a macroblock data memory for storing macroblock data of a current video frame; a first sub sampling circuit for sub-sampling by ratio M:1 the video data of a previous frame read from the search region data memory in response to a sub-sampling rate control signal; a data array circuit for arraying video data outputted from the first sub-sampling circuit so that motion vector estimation candidates can be outputted sequentially a second sub-sampling circuit for sub-sampling, by ratio M:1, current video frame data read from the macroblock data memory in response to the sub-sampling rate control signal; a search region deciding circuit for outputting a search region decision signal; a processing element (PE) array network for sequentially calculating a SAD (sum of absolute differences) value of the data outputted from the first sub-sampling circuit and the search region data outputted from the data array circuit, according to a designation of the search region decided by the search region deciding circuit, to sequentially output a plurality of SAD values; a motion vector comparator for receiving the plurality of SAD (sum of the absolute differences) values sequentially outputted from the PE array network, and comparing the SAD value with a previous SAD value, to detect a minimum SAD value as a motion vector value.

The motion estimator can further comprise: a macroblock measure circuit for receiving the current frame video data read from the macroblock data memory to calculate the sum of absolute differences between a mean intensity of a macroblock and an intensity of each pixel of the macroblock; and wherein the search region deciding circuit is adapted to output the search region decision signal based upon the sum (A) of absolute differences between a mean intensity of a macroblock and the intensity of each pixel of the macroblock as calculated by the macroblock measure circuit.

Another aspect of the present invention provides a motion estimation method of a video encoder, comprising: a first step of performing a full search within a ±4 pixel search region in a first video frame for a 4×4 pixel block of a second video frame, wherein both of the resolution of first frame and the second frame are reduced by sub-sampling to ¼ resolution of the original video frames, to detect two motion vector candidates.

Another aspect of the present invention provides a motion estimation method of a video encoder, comprising: a first step of performing a search for a N×N pixel block (wherein N is an integer, e.g., 16) within a search region containing a plurality (S) of search points (e.g., S equals 25 for a ±2 pixel search region), wherein the N×N pixel block is operatively divided into $4^P$ (e.g., 4 or 16) sub-blocks, wherein P is an integer, and wherein the search for the N×N pixel macroblock is effectively performed by performing one full search within the search region for each one of the $4^P$ sub-blocks. Full searches performed within the search region for each one of the $4^P$ sub-blocks generates a plurality of motion vector candidates.

BRIEF DESCRIPTION OF THE DRAWINGS

Preferred embodiments of the invention will become apparent from the following description in conjunction with the accompanying drawings, in which.

DETAILED DESCRIPTION OF PREFERRED EMBODIMENTS

Hereinafter, preferred embodiments of the present invention will be described in detail with reference to FIGS. 2 through 10. For purposes of clarity, a detailed description of functions and systems known to persons skilled in the art have been omitted.

With reference to FIGS. 2 through 10, the operation of exemplary embodiments of the present invention will be described in detail, as follows.

A multi-resolution search using multiple candidates and spatial correlation of motion field (MRMCS) uses numerous motion vector candidates as the basis of a hierarchical search block matching algorithm (HSBMA), and also is an algorithm to increase efficiency by using a candidate obtained by using a spatial correlation. A basic idea of the spatial correlation algorithm is the presumption that a motion vector of a block representing part of a moving physical object is similar to a motion vector of spatially neighboring blocks (of the same physical object). A method of deciding a motion vector candidate by using such a spatial correlation is provided referring to FIG. 2. The motion vector candidate determined using a spatial correlation of a current macroblock can be obtained through the following mathematical formula 1

$$MV^C x = \text{Median}(MV^1 x, MV^2 x, MV^3 x), MV^C y = \text{Median}(MV^1 y, MV^2 y, MV^3 y)$$ [Mathematical Formula 1]

In mathematical formula 1 the superscripts 1, 2, 3 and C do not denote exponents, and $MV^1$, $MV^2$, $MV^3$ indicate three motion vectors neighboring a current macroblock, $MV^C$ designates a medium value of the three motion vectors, in which the value is reduced to ½ in a size for x, y ingredients.

Figure 1:
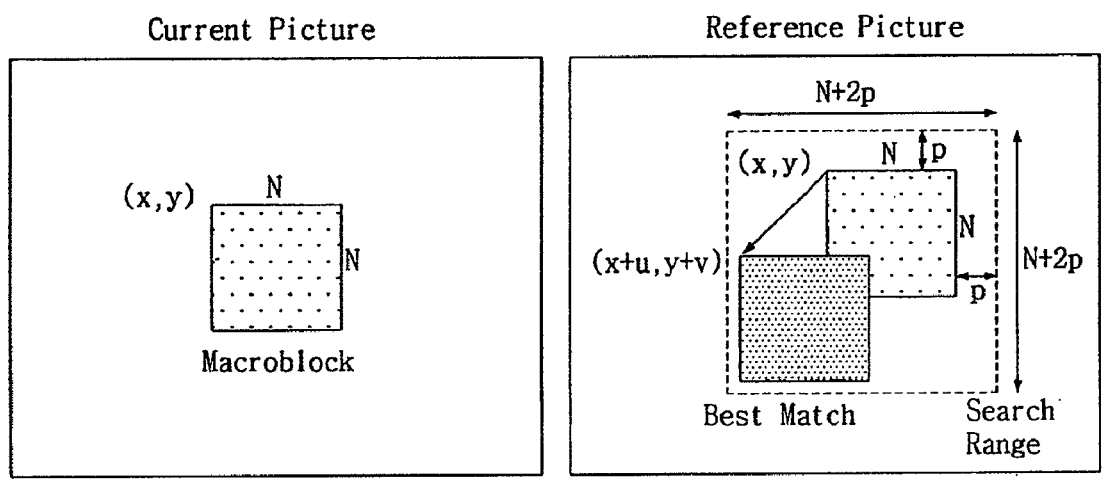
FIG. 1 is a diagram showing a general structure of a conventional block matching algorithm for estimating a motion vector relative to macroblocks of a current video frame and a previous (reference) video frame, within a predetermined search range (search region)
Figure 2:
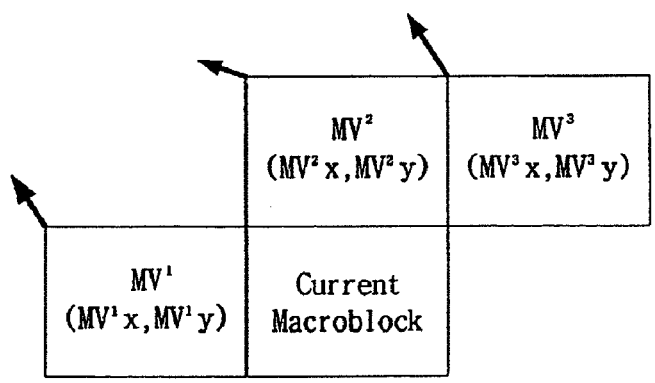
FIG. 2 is a diagram illustrating a conventional selection of a motion vector candidate macroblocks using a spatial correlation of macroblocks.
Figure 3:
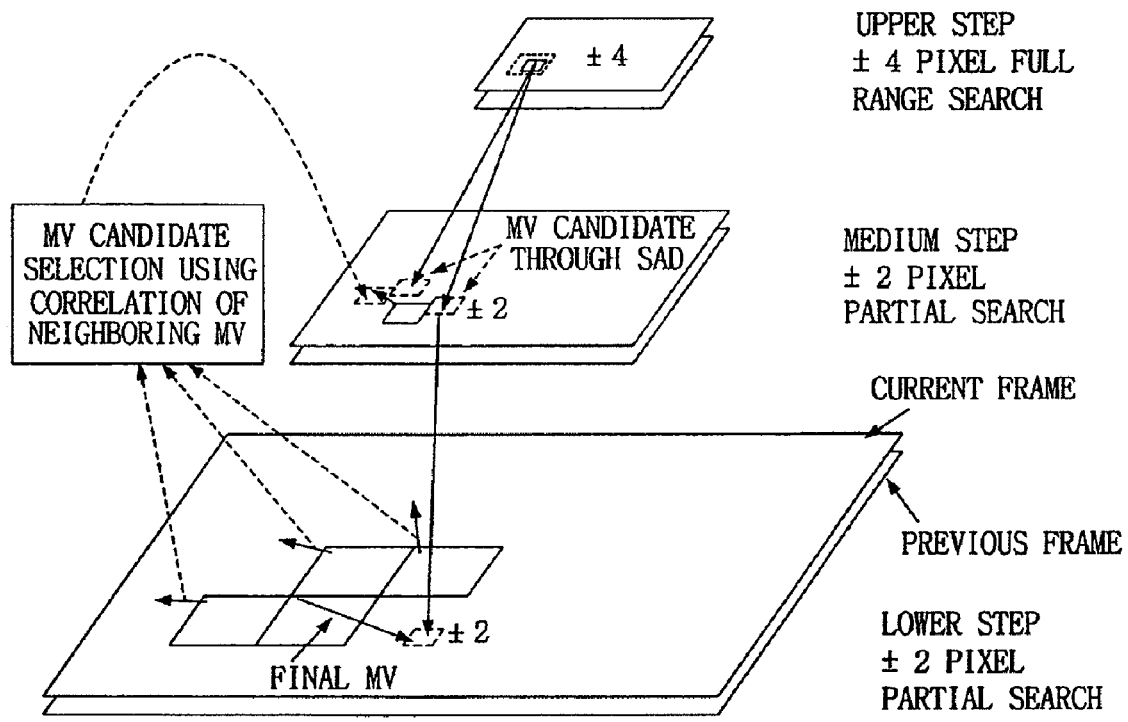
FIG. 3 is a diagram showing a method of selecting motion vector candidates and computing a final motion vector using an MRMCS algorithm in accordance with an embodiment of the present invention.

The MRMCS algorithm has a hierarchical structure of three steps: upper, medium and lower steps wherein the resolution of video frame data is correspondingly lowered as shown in FIG. 3. The upper step uses video frame data reduced to ¼ of the original video frame resolution, and a full range search for a 4×4 pixel block is performed within a ±4 pixel search region. Then, two search points having the smallest SAD (Sum of Absolute Differences) values are used as motion vector candidates in the medium step, plus one motion vector candidate obtained using a spatial correlation is selected based on the previously determined motion vectors of neighboring macroblocks is also used as a motion vector candidate in the medium step.

The medium step uses video frame data at ½ the resolution of the original video frame data, and performs a partial search for the total three motion vector candidates (comprising two candidates selected in the upper step and one candidate having a spatial correlation with neighboring macroblocks), in a ±2 pixel search region for a 8×8 pixel block. An obtained optimized motion vector candidate is applied to a full-resolution in the lower step search for detecting the final motion vector.

The lower step uses the original video frame resolution intact, and performs a partial search in a ±2 pixel search region for a 16×16 pixel macroblock. A motion vector having the smallest SAD value obtained in the lower step is selected as the final motion vector. To obtain an improved prediction mode, a search is performed, not only for a matching macroblock of 16×16 pixel size, but also for a block of 8×8 pixel size. Thus, four 8×8 block motion vectors found positioned in the neighborhood of the 16×16 macroblock. Thus, a motion vector of the 16×16 pixel macroblock and four motion vectors of the 8×8 pixel blocks within the 16×16 pixel current frame macroblock are obtained at the same time.

In the conventional hierarchical search algorithm, the size of a block and of a search region is different in each of the upper, middle and lower steps, and the number of PEs (Processing Elements) is proportional to that. Thus, the number of the PEs needed for each step is different, which is inefficient in a hardware embodiment. Therefore, instead of a separate PE for processing each step, an embodiment of the present invention provides one basic search unit to be sequentially applied within the search region and block in each of the steps so as to reduce the number of the PEs required.

Table 1 summarizes the search in each step to realize the MRMCS algorithm referred to in FIG. 3.

TABLE 1

| Step | Sub-sampling | The Number of Candidates | Block Size | Search Region |
| --- | --- | --- | --- | --- |
| Upper | 4:1 | 1 | 4 × 4 | ±4 |
| Medium | 2:1 | 3 | 8 × 8 | ±2 |
| Lower | NO | 1 | 16 × 16 | ±2 |

As applied to a search region [−16,15], the smallest (4×4 pixel) size among block sizes in each step is selected, and the smallest (±2 pixel) search region among the search regions is selected, to be used as a basic search unit. Thus, the basic search unit has a method and a hardware structure for performing a search in a ±2 pixel search region for the block of 4×4 pixel size. A full search in a ±2 pixel search region geometrically implies 25 search points. A full search in a ±1 pixel search region geometrically implies 9 search points.

The basic search unit performs a search (e.g., for a 4×4 pixel block) within the ±2 pixel search region to obtain SAD values for 25 search points. A structure capable of obtaining one search point SAD value at one time can be used instead of 16 PEs. Thus, a SAD value is obtained for one search point at one time. To obtain SAD values for all of the 25 search points, the basic search unit is applied 25 times.

In the upper step, a search within a ±4 pixel search region for the 4×4 pixel block is performed. A full search in a ±4 pixel search region geometrically implies 81 search points. Thus the ±4 pixel search region is divided into four regions and the basic (±2 pixel) search unit is repeated four times in performing the search. SAD values for all 81 search points are obtained, and among the obtained values, two candidates having the smallest SAD values are determined.

Figure 4A:
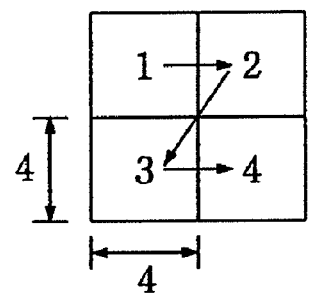
FIG. 4a illustrates an exemplary search order sequence of sub-blocks within a 8×8 pixel block as applied to a medium step of the MRMCS algorithm in accordance with an embodiment of the present invention.
Figure 4B:
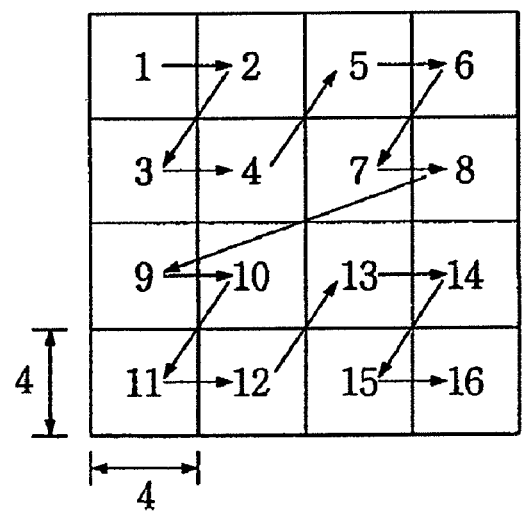
FIG. 4b illustrates an exemplary search order sequence of sub-blocks within a 16×16 pixel block as applied to a lower step of the MRMCS algorithm in accordance with an embodiment of the present invention.

In medium and lower steps, the search is performed by dividing the block or macroblock as shown in FIGS. 4a and 4b respectively. In the medium step, a 8×8 block is effectively divided into four sub-blocks each sub-block constituting a 4×4 pixel block as shown in FIG. 4a. A search is performed for each 4×4 pixel sub-block. In the lower step, a 16×16 block (macroblock) is effectively divided into 16 sub-blocks each sub-block constituting a 4×4 pixel block unit as shown in FIG. 4b, to perform the search. In the lower step, for an improved prediction mode, independent SAD values for the ±2 search region of each of the four 4×4 sub-blocks within a 8×8 block are obtained, and independent SAD values for the 16×16 block are obtained, and thus SAD values for the 16×16 block are simultaneously obtained. Also, in case the search region is increased to [−32, 31], only the search region of the upper step need be extended to ±8 pixels.

If the search region is [−w, w−1], the computational complexity $C_{MRMCS}$ for a motion estimation of the MRMCS algorithm can be obtained by the following mathematical formula 2.

$$C_{MRMCS} = C^{(2)} + C^{(1)} + C^{(0)} \quad \text{[Mathematical Formula 2]}$$

$$= \frac{\left[\left(\frac{w}{2}+1\right)^2\left(\frac{1}{2^2}\right)^2 + 3\times5\left(\frac{1}{2}\right)^2 + 5^2\left(\frac{1}{2^0}\right)^2\right] \times M \times 16^2(W \times H)}{16^2 \times R_f},$$

wherein, superscripts "(2)" "(1)" and "(0)" are not exponents, and $C^{(2)}$ $C^{(1)}$ $C^{(0)}$ each designate a computational complexity of the upper, medium and lower steps, W×H indicates a size of a video search region, and M is an operational number for calculating SAD per pixel, and R denotes a frame rate.

As shown in the mathematical formula 2, in case the search region is [−16, 15], about 90% of the calculation amount for the motion estimation in the MRMCS algorithm is used in the medium and lower steps.

Most video frame sequences contain one or more regions having a small intensity variation amount ($VAR_{MB}$), in which a spatial correlation between neighboring pixels is large, (which means that a change of intensity or luminance value between pixels is not large). In other words, an intensity variation amount of a video frame block indicates a spatial correlation between pixels, and the determination of such a characteristic can be used in a method of effectively reducing the calculation amount for a prediction in the motion estimation procedure.

About 90% of the calculation amount for the motion estimation in the MRMCS algorithm is used in the medium and lower steps, and a partial search in a ±2 pixel search region is performed for each of 8×8 block and for each 16×16 pixel block in the medium and lower steps.

In the present invention, the search region for the partial search of the medium and lower steps is varied between ±1 pixels or ±2 pixels according to a determination of n the intensity variation amount ($VAR_{MB}$) of each macroblock of an input video frame, by taking advantage of the relationship between the spatial correlation between pixels and the intensity variation amount ($VAR_{MB}$) of the video frame data. Thereby, the calculation amount for the motion estimation can be substantially reduced which improves the performance of the MRMCS algorithm. In this optimized MRMCS algorithm, a reference value, namely, a threshold (TH), is determined according to the desired calculation amount and an acceptable prediction precision level of the motion estimation, and an intensity variation of each macroblock, which is compared with the determined threshold (TH) to vary (e.g., between ±1 pixels and ±2 pixels) the search region for the partial search of the medium and lower steps and obtain a final motion vector.

The intensity variation of each macroblock for an N×N pixel size is obtained by the following mathematical formula 3.

$$VAR_{MB} = \frac{1}{N^2}\sum_{i=1}^{N}\sum_{j=1}^{N}|AVG_{MB} - I(i, j)| \quad \text{[Mathematical Formula 3]}$$

Herewith, I(i,j) represents an intensity or luminance value of a pixel within an i×j pixel macroblock whose position is I(i,j), and $AVG_{MB}$ designates a mean intensity of the same macroblock and is obtained by the following mathematical formula 4.

$$AVG_{MB} = \frac{1}{N^2}\sum_{i=1}^{N}\sum_{j=1}^{N}I(i, j) \quad \text{[Mathematical Formula 4]}$$

The computation of the intensity variation of input video frame data operates like a high-pass filter, in that it indicates a complexity of the video image data, which offers a measure for a spatial correlation between pixels.

Figure 5:
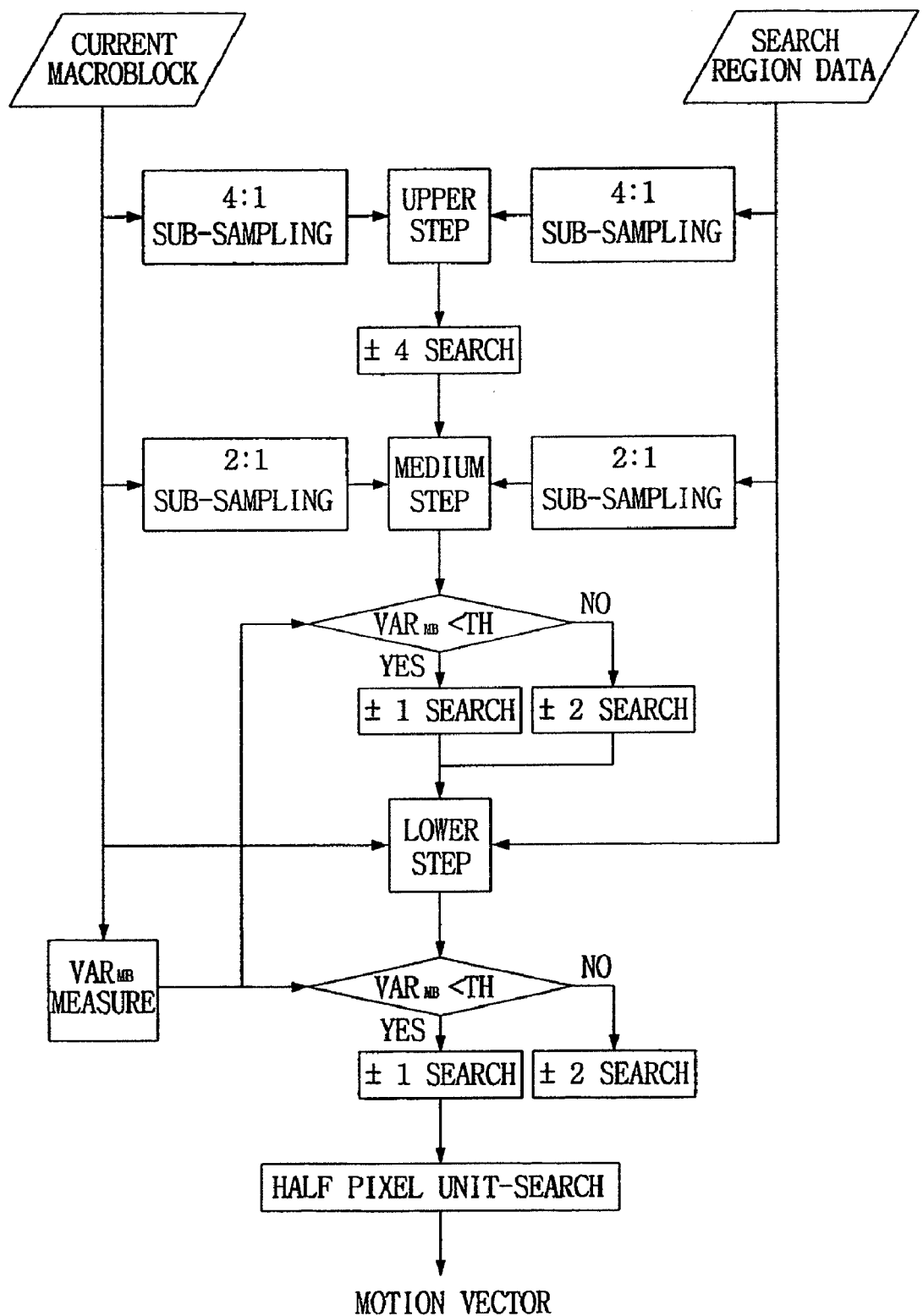
FIG. 5 is a flow chart for the control of a motion estimation method in accordance with an exemplary embodiment of the present invention.

FIG. 5 shows a method of realizing a proposed algorithm according to an embodiment of the invention, wherein an intensity variation $VAR_{MB}$ is calculated for each macroblock of an input video frame, and in an upper step a full range search for a ±4 pixel search region is performed on a 4×4 pixel block according to the MRMCS algorithm. In the medium and lower steps, a determined threshold and an intensity variation for each 8×8 pixel block in a 16×16 pixel block are compared to perform a partial search for a ±1 or a ±2 pixel search region and search a final motion vector.

If the search region is [−w, w−1], the computational complexity for a motion estimation in a proposed algorithm can be calculated by the following mathematical formula 5.

$$C_{PROPOSED} = C^{(2)} + C^{(1)'} + C^{(0)'}$$

$$= \left[\left(\frac{w}{2} + 1\right)^2 \left(\frac{1}{2^2}\right)^2 + 3 \times\right.$$

$$[3^2 t + 5^2(1-t)]\left(\frac{1}{2^1}\right)^2 +$$

$$\left.[3^2 t + 5^2(1-t)]\left(\frac{1}{2^0}\right)^2\right] \times$$

$$\frac{M \times 16^2 (W \times H)}{16^2 \times R_f}$$

[Mathematical Formula 5]

Herein the superscripts "(2)" "(1)" and "(0)" are not exponents, and, $C^{(1)'}$, $C^{(0)'}$ each indicate a complexity of proposed medium and lower steps, and t indicates a rate for the number of macroblocks to which a ±1 search region for the number of all the macroblocks of W×H size is applied.

In each step, 1 cycle is taken to obtain a SAD value for one search point, thus in case the search region is [−16,15], the total number or required cycles is reduced to 52% in case a partial search region is ±1 pixels, as compared with ±2 pixels.

A decision for an intra or inter mode (to decide an intra or inter prediction mode in encoding by a video encoder after a motion estimation of an integer pixel number is completed), is obtained by the following procedures.

The sum value (A) of absolute differences between a mean intensity for each macroblock and an intensity of each pixel is obtained by the following mathematical formula 6.

$$A = \sum_{i=1}^{16} \sum_{j=1}^{16} |MB_{mean} - I(i, j)|$$

[Mathematical Formula 6]

Figure 6:
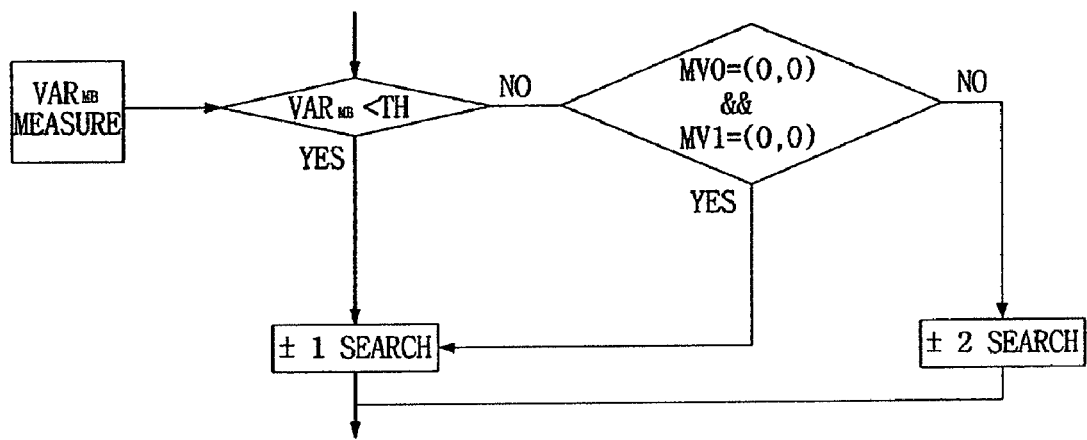
FIG. 6 is a flow chart for the selection of a ±1 pixel or a ±2 pixel search region for a partial search of medium and lower steps according to an exemplary embodiment of the present invention.

When the sum (A) is smaller than $SAD_{inter} - 2N_B$, it is decided to perform the intra mode, and if not, the inter mode is selected, and in the inter mode, a half pixel search is performed. Herein, $MB_{mean}$ indicates a mean intensity of each macroblock, and is equal to $AVG_{MB}$ of the mathematical formula 4, and $N_B$ generally has a value of 256 for each 16×16 pixel macroblock. The mathematical formulas 3 and 6 have the same type excepting an operation dividing by $N^2$. Thus a method proposed to improve a capability of the MRMCS algorithm can be realized, by adding only a few control circuits for performing a search for search regions of medium and lower steps by ±1 or ±2, and a comparator for comparing a normalized sum $VAR_{MB}$ (sum A divided by $N^2$) with a determined threshold, to hardware for making a decision between intra/inter modes. There are many portions of a video frame where there is no motion in a general motion video.

Where the proposed algorithm is applied to a foreman QCIF (Quarter Common Intermediate Format) motion-video 90 frame, macroblocks having no motion reaches 36%. In a case that, among three candidates used in the medium step, a result of a candidate using a spatial correlation in the lower step, and a result of a candidate having a minimum SAD in the upper step, it is 55% that are predicted as no motion; and from such a case, it reaches 59% for a case where a result of a finally predicted motion vector has a prediction of no-motion. When such a result is applied to a proposed algorithm, and under an assumption that prediction results of the candidate using the spatial correlation in the lower step and the candidate having a minimum SAD in the upper step, are each MV0 and MV1, and in case there is no motion for MV0 and MV1, the partial search region applied in the medium and lower steps is ±1 pixels. This decision can be realized by comparing a number proportional to a intensity variation sum (e.g., sum A or normalized sum $VAR_{MB}$) with a determined threshold, as shown in FIG. 6.

Figure 7:
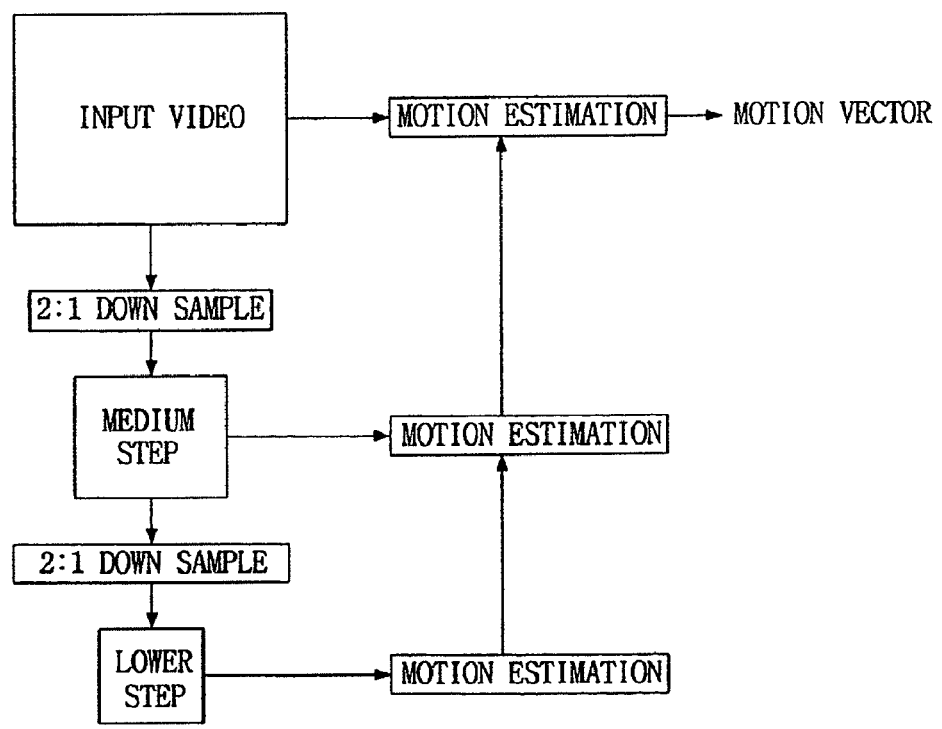
FIG. 7 is a diagram showing a flow of a conventional hierarchical search block matching algorithm.

The method proposed in the present invention can be also applied to a general hierarchical search block matching algorithm referred to FIG. 7, excepting the candidate of a motion vector selected based upon spatial correlation in the MRMCS algorithm.

Figure 8:
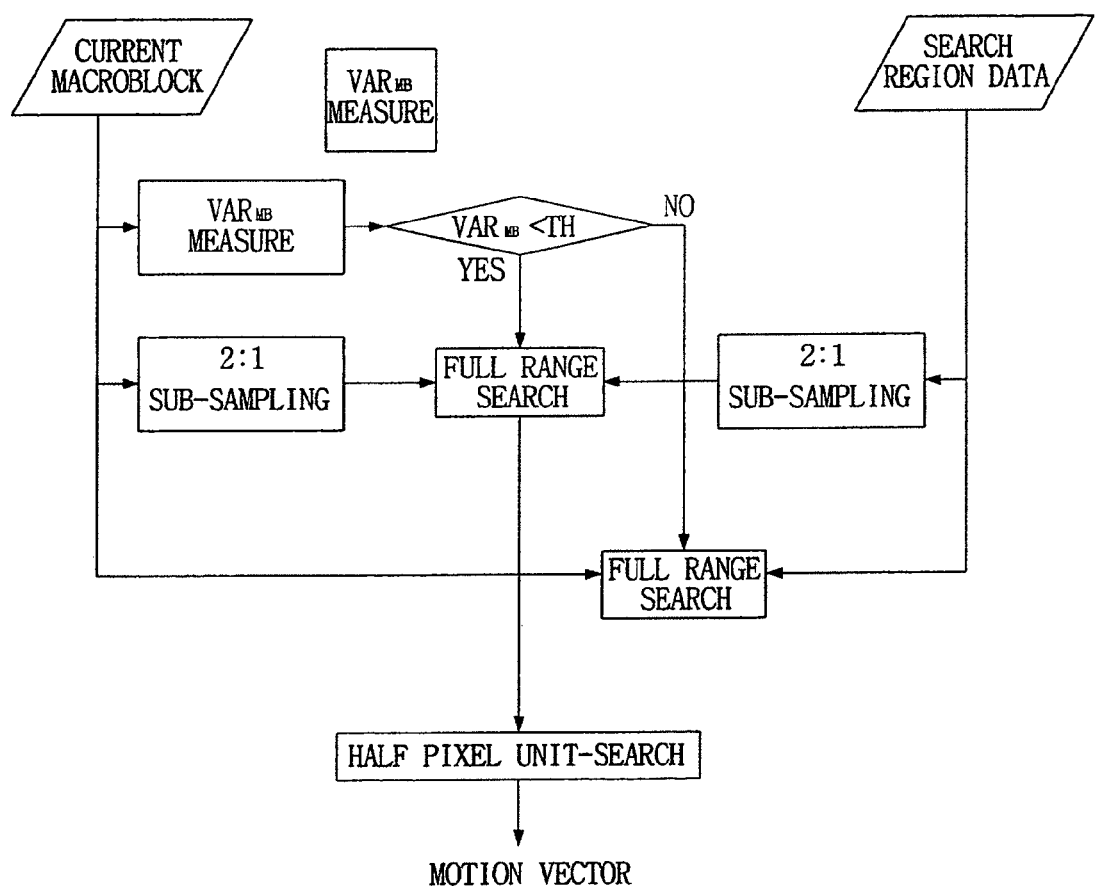
FIG. 8 is a flow chart depicting a full search block matching algorithm for a motion estimation of video data according to an exemplary embodiment of the present invention.

FIG. 8 depicts a method of using the intensity variation characteristic (e.g., sum A or normalized sum $VAR_{MB}$) in the full search block matching algorithm. If the intensity variation (e.g., sum A or normalized sum $VAR_{MB}$) of a current macroblock is smaller than a determined threshold, the full search block matching algorithm is applied by using a video of a low resolution (e.g., sub-sampled by ratio 2:1 down from an original video frame resolution), and if not, the full search block matching algorithm is applied to video frame data in the original resolution.

Sub-sampling reduces the amount of data by throwing some of it away. Sub-sampling reduces the number of pixels used to describe the image. Sub-sampling can be performed in the following two ways. The original image is copied but only a fraction of the pixels from the original are used (e.g., pixels in every second row and every second column are ignored). Alternatively, sub-sampling can be implemented by calculating the average pixel value for each group of several pixels, and then substituting this average in the appropriate place in the approximated image.

In a general block matching algorithm, the number of search points (the search range) for the motion estimation is reduced (to lower the complexity of a motion estimator) according to a decision based upon a comparison between an intensity variation (e.g., sum A or normalized sum $VAR_{MB}$) of an input macroblock and a threshold.

An application of such a method reduces by a factor of ¹⁄₁₆ the computational complexity for the motion estimation as compared with a case wherein such a method is not applied. This method sequentially compares an intensity variation (e.g., sum A or normalized sum $VAR_{MB}$) of a macroblock with threshold values in the several steps of the algorithm. The full search block matching algorithm is applied to a video resolution of each step decided according to its comparison result, to further reduce the complexity for the motion estimation.

Figure 9:
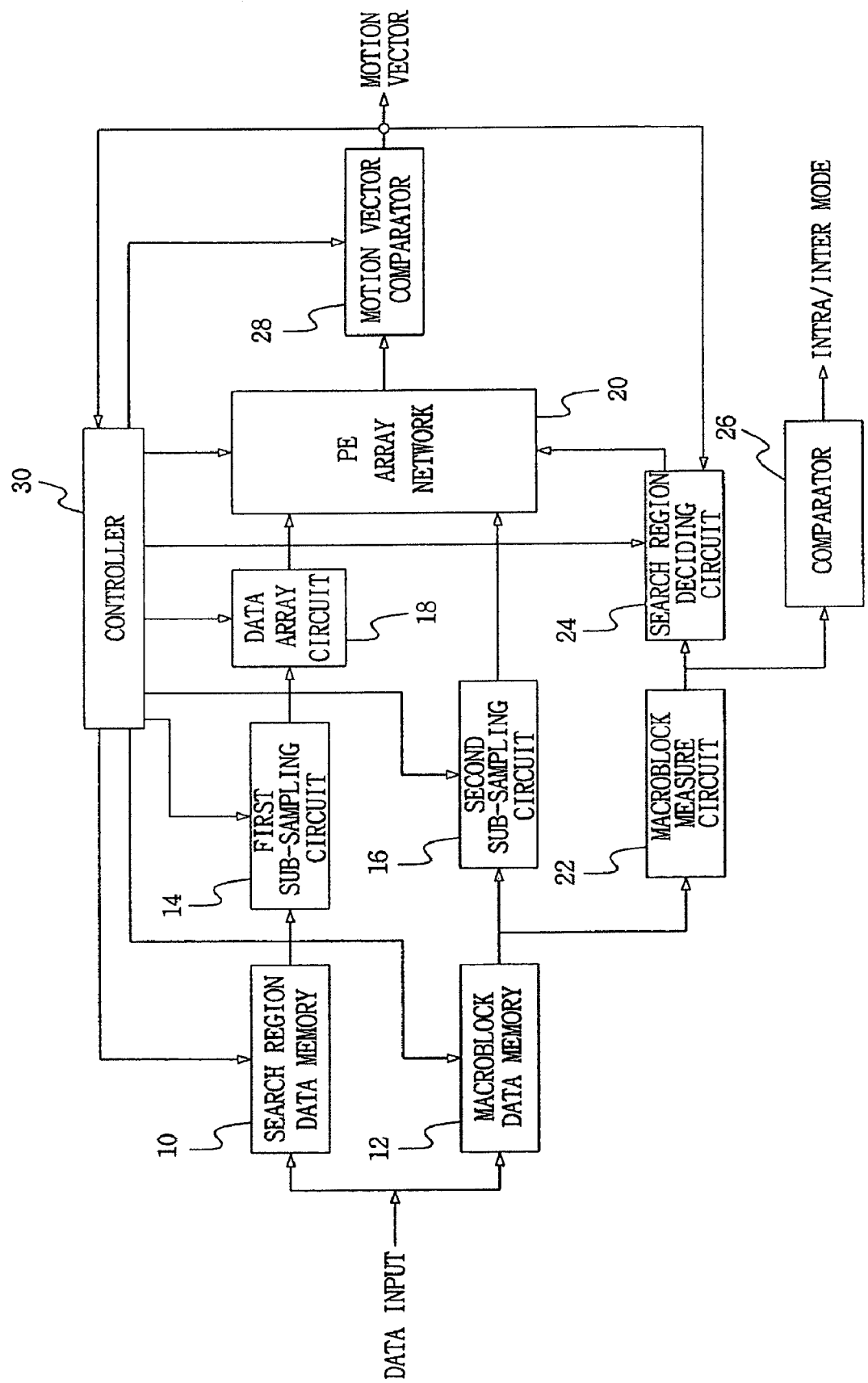
FIG. 9 is a block diagram of a motion estimator for performing a motion estimation of video data according to an exemplary embodiment of the present invention.

FIG. 9 is a hardware block diagram of a motion estimator that applies such an algorithm for estimating a hierarchical motion vector of video data.

Referring to FIG. 9, it includes a search region data memory 10, a macroblock data memory 12, a first sub-sampling circuit 14, a data array circuit 18, a second sub-sampling circuit 16, a macroblock measure circuit 22, a search region deciding circuit 24, a comparator 26, a processing element (PE) array network 20, a motion vector comparator 28, and a controller 30.

The search region data memory 10 stores video data of a previous frame for designating a search region, and the macroblock data memory 12 stores macroblock data of a current video frame, and the first sub-sampling circuit 14 sub-samples by ratio M:1 the previous frame video data read from the search region data memory 10 in response to a given sub-sampling rate control signal. The data array circuit 18 arrays block data outputted from the first sub-sampling circuit 14 so that motion vector estimation candidates are outputted sequentially.

The second sub-sampling circuit 16 sub-samples by ratio M:1 the current frame video data read from the macroblock data memory 12 in response to a determined sub-sampling rate control signal, and the macroblock measure circuit 22 receives current macroblock video data read from the macroblock data memory 12 to calculate the sum value A of absolute differences between a mean intensity of all the N pixels in a macroblock, and an intensity of each of the N pixels in the macroblock. The search region deciding circuit 24 receives the sum (A) of absolute differences between the mean intensity of a macroblock and the intensity of each pixel, to obtain an intensity variation value of each macroblock and output a search region decision signal. The comparator 26 compares the sum value A of the absolute differences between the mean intensity of the macroblock (calculated by the macroblock measure circuit 22), and the intensity of each pixel, with a predetermined threshold value (TH), to thus decide an intermode or intramode.

The PE array network 20 receives search region data outputted from the data array circuit 18, and macroblock data outputted from the second sub-sampling circuit 16, and sequentially calculates a plurality of SAD (sum of absolute differences) values according to a designation of a search region decided by the search region deciding circuit 24, to output a series of SAD (sum of absolute difference) values. The motion vector comparator 28 receives the SAD values sequentially outputted from the PE array network 20, and compares each SAD value with its previous value, to detect a minimum SAD value to indicate a motion vector. The controller 30 generates a sub-sampling rate control signal per each step to obtain a motion estimation, and an address to read and write macroblock data and search region data, and receives a motion vector value detected per each step to output a motion estimation candidate designation signal.

Figure 10:
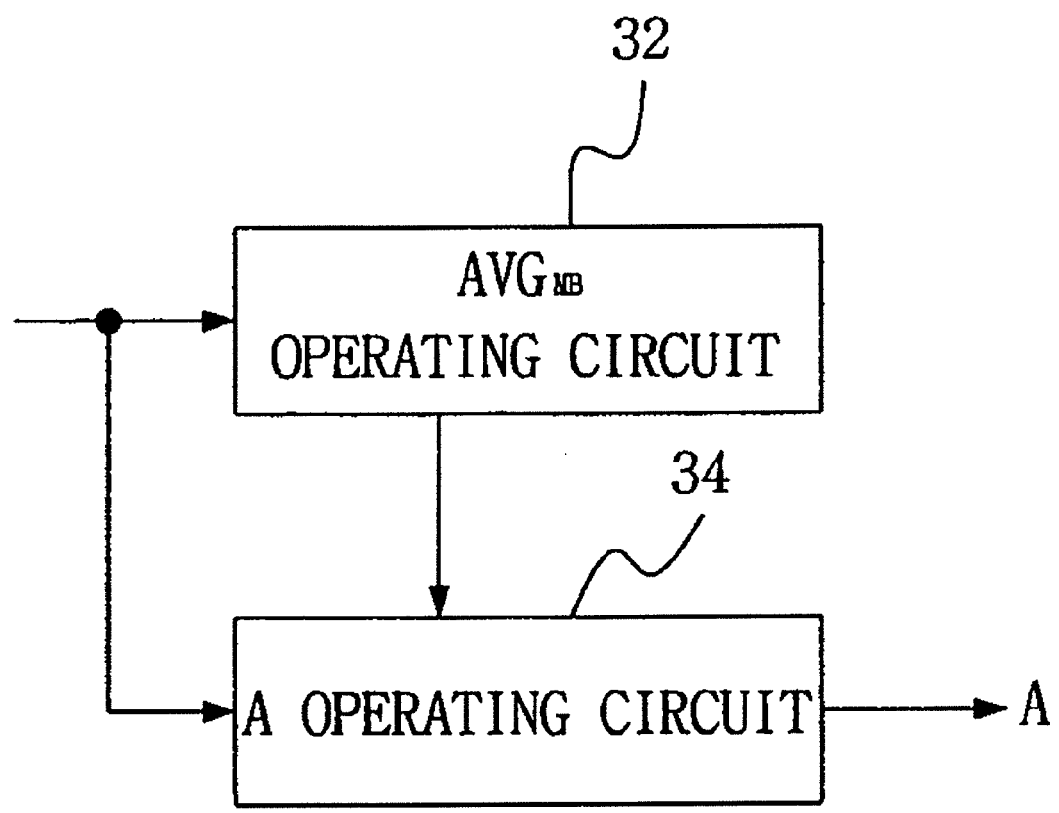
FIG. 10 is a detailed block diagram of a macroblock measure circuit referred to in FIG. 9 according to an exemplary embodiment of the present invention.

FIG. 10 is a detailed block diagram of the macroblock measure circuit 22 according to an exemplary embodiment of the present invention, including an $AVG_{MB}$ operating (calculating) circuit 32 for receiving current macroblock data and calculating a mean intensity value $AVG_{MB}$ of each macroblock, and a sum A operating (calculating) circuit 34 for receiving the current macroblock data to calculate the sum (A) of the absolute differences between the mean intensity of each macroblock and the intensity of each pixel.

Operations for a motion estimation method of the present invention are described with reference to FIGS. 9 and 10.

The search region data memory 10 stores video data of a search region for a previous frame. The macroblock data memory 12 stores macroblock data of a current video for one frame.

In an upper step the controller 30 applies a 4:1 sub-sampling control signal to the first and second sub-sampling circuits 14, 16. Then, the first sub-sampling circuit 14 sub-samples, by ratio 4:1, previous frame video data read from the search region data memory 10, and outputs the data. The second sub-sampling circuit 16 sub-samples, by ratio 4:1, current frame video data read from the macroblock data memory 12 in response to a given sub-sampling rate control signal, and applies the data to the PE array network 20. The data array circuit 18 arrays the data outputted from the first sub-sampling circuit 14 in response to a control signal of the controller 30 so that motion vector estimation candidates are sequentially outputted.

Also, the macroblock measure circuit 22 receives the current frame video data read from the macroblock data memory 12 to calculate the sum value (A) of absolute differences between a mean intensity of a macroblock, and an intensity of each pixel. In the macroblock measure circuit 22, as shown in FIG. 10, the $AVG_{MB}$ calculating circuit 32 receives the current frame video data read from the macroblock data memory 12 to obtain an $AVG_{MB}$ value through the mathematical formula 4. The sum (A) calculating circuit 34 receives the current frame video data read from the macroblock data memory 12 to obtain the sum (A) of absolute differences between the mean intensity of each macroblock and the intensity of each pixel by using the $AVG_{MB}$ value outputted from the $AVG_{MB}$ calculating circuit 32 through use of the mathematical formula 4.

The search region deciding circuit 24 receives the sum (A) of absolute differences between the mean intensity of a macroblock (calculated by the macroblock measure circuit 22) and an intensity of each pixel, to obtain an intensity variation value $VAR_{MB}$ of each macroblock through the mathematical formula 3, and outputs a search region decision signal according to a prediction result of a candidate using a spatial correlation, an optimum candidate of the upper step, and the intensity variation value $VAR_{MB}$ of the macroblock, to decide a search region for a partial search of medium and lower steps. In the upper step the search region deciding circuit 24 applies a ±4 search decision signal to the PE array network 20 to perform a full search. The comparator 26 compares the sum (A) of the absolute differences between the mean intensity of the macroblock (calculated by the macroblock measure circuit 22) and the intensity of each pixel, with a predetermined threshold value, to output an intermode or intramode decision signal.

The PE array network 20 receives the search region data outputted from the data array circuit 18 and 4×4 pixel block data outputted from the second sub-sampling circuit 16, and sequentially calculates the data according to a designation of a search region decided by the search region deciding circuit 24 in response to a control signal of the controller 30, to thus output a sum value SAD of absolute differences. Thus, the PE array network 20 divides the ±4 pixel search region for the 4×4 pixel block into four (±2 pixel) search regions, performs a basic search unit repeatedly, (four times), and sequentially outputs the SAD (sum of the absolute differences) values, in response to a control signal of the controller 30.

The motion vector comparator 28 receives the SAD (sum of the absolute differences) values sequentially outputted from the PE array network 20, and compares each SAD value with its previous value, to detect a minimum SAD value as indicating a motion vector value and supplies detected motion vector to the controller 30. At this time, the controller 30 generates a sub-sampling rate control signal corresponding to an upper step to obtain a motion estimation, and an address for reading macroblock data and search region data, and receives two motion vector values detected in the upper step to output a motion vector candidate designation signal. When such a motion estimation of the upper step is completed, the controller 30 performs a control to perform a motion estimation operation of a medium step.

At this time, the controller 30 applies a 2:1 sub-sampling control signal to the first and second sub-sampling circuits 14, 16. Then, the first sub-sampling circuit 14 sub-samples, by subsampling ratio 2:1, previous frame video data read from the search region data memory 10, and outputs the sub-sampled video frame data. The second sub-sampling circuit 16 sub-samples, by subsampling ratio 2:1, current frame video data read from the macroblock data memory 12 in response to a given sub-sampling rate control signal, and converts the data into 8×8 pixel block data and then applies the data to the PE array network 20. The data array circuit 18 arrays the data outputted from the first sub-sampling circuit 14 in response to a control signal of the controller 30 so that motion vector candidates are sequentially outputted.

At this time, the search region deciding circuit 24 compares an intensity variation value $VAR_{MB}$ of each macroblock obtained as shown in FIG. 6 with a determined threshold TH. If the intensity variation value $VAR_{MB}$ is greater than the determined threshold TH, the search region deciding circuit 24 applies a ±1 search decision signal to the PE array network 20. If the intensity variation value $VAR_{MB}$ is smaller than the determined threshold TH and if it is decided that a prediction result of an optimum candidate of the upper step and a candidate using a spatial correlation has no motion, the search region deciding circuit 24 applies the ±1 search decision signal to the PE array network 20; Otherwise, the search region deciding circuit 24 applies a ±2 search decision signal to the PE array network 20.

The PE array network 20 sequentially calculates SAD (sum of absolute differences) values for 8×8 pixel block data outputted from the second sub-sampling circuit 16, for the search region data outputted from the data array circuit 18, according to a designation of the search region decided by the search region deciding circuit 24, in response to a control signal of the controller 30, and then outputs the SAD values.

Then, the PE array network 20 divides the 8×8 pixel block data into four sub-blocks (4×4 pixel blocks) as shown in FIG. 4a, and calculates and outputs the SAD (sum of absolute differences) values for each of the four sub-blocks. The motion vector comparator 28 receives the SAD values sequentially outputted from the PE array network 20, and compares each SAD value with the previous minimum SAD value to detect a new minimum SAD value as a motion vector value and applies the motion vector value to the controller 30. The controller 30 generates a medium-step sub-sampling rate control signal for a motion estimation, and an address for reading macroblock data and search region data, and receives a motion vector value detected as a medium step to output a motion vector candidate designation signal. When such a motion estimation of the medium step is completed, the controller 30 performs a control to perform a motion estimation operation of a lower step.

That is, the controller 30 applies a 1:1 sub-sampling control signal (signifying full resolution) to the first and second sub-sampling circuits 14, 16. Then, the first sub-sampling circuit 14 does not actually "sub-sample" the previous frame video data read from the search region data memory 10, but outputs the data in its original resolution; and the second sub-sampling circuit 16 does not actually "sub-sample" current frame video data read from the macroblock data memory 12 pursuant to the 1; 1 sub-sampling rate control signal, but applies 16×16 pixel macroblock data intact to the PE array network 20. The data array circuit 18 arrays the search region data outputted from the first sub-sampling circuit 14 in response to a control signal of the controller 30 so that motion vector estimation candidates are sequentially outputted.

The search region deciding circuit 24 compares the obtained intensity variation value (e.g., $VAR_{MB}$) of each macroblock with the determined threshold TH. If the intensity variation value (e.g., $VAR_{MB}$) is greater than the determined threshold TH, the search region deciding circuit 24 applies a ±1 pixel search decision signal to the PE array network 20. If the intensity variation value $VAR_{MB}$ is smaller than TH and if it is decided that a prediction result of an optimum candidate of the upper step and a candidate using a spatial correlation has no motion, the search region deciding circuit 24 applies the ±1 pixel search decision signal to the PE array network 20;

but if it is decided that the prediction result has a motion, the search region deciding circuit 24 applies a ±2 pixel search decision signal to the PE array network 20. The PE array network 20 sequentially calculates 16×16 pixel block data outputted from the second sub-sampling circuit 16, for the search region data outputted from the data array circuit 18, according to a designation of the search region decided by the search region deciding circuit 24, in response to a control signal of the controller 30, and then outputs SAD (sum of absolute differences) values. At this time, the PE array network 20 divides the 16×16 pixel macroblock unit data into 16 4×4 pixel sub-blocks as shown in FIG. 4b, and calculates and outputs the SAD (sum of absolute differences) values for each of the 16 sub-blocks. The motion vector comparator 28 receives the SAD values sequentially outputted from the PE array network 20, and compares each SAD value with a previous minimum SAD value to detect a minimum SAD value as a motion vector value and apply the motion vector value to the controller 30. The controller 30 receives and momentarily stores the motion vector value detected as the lower step, and then outputs motion vector candidate designation signals until a motion vector estimation operation of the lower step is completed. A half pixel search for an optimum motion vector candidate obtained in the lower step is performed to obtain a final motion vector.

As described above, a search region for a partial search of medium and lower steps is varied (between ±1 and ±2 pixels) by taking advantage of the principle that a spatial correlation between pixels is related to an intensity variation amount of a video portion and by using a prediction result of an optimum candidate of an upper step and a candidate using a spatial correlation, thereby remarkably reducing a calculation amount for a motion estimation and reducing an operating time of a motion estimator, and further lowering a power consumption.

It will be apparent to those skilled in the art that various modifications and variations can be made in preferred embodiments of the present invention without departing from the spirit or scope of the invention. Thus, it is intended that the present invention, as defined by the appended claims, shall cover such modifications and variations of the embodiments.

What is claimed is:

1. A motion estimation method of a video encoder, the method comprising:
    a first step of performing, by a motion estimator of the video encoder, a full search within a ±4 pixel search region in a first video frame for a 4×4 pixel block of a second video frame,
    wherein original video resolutions of the first video frame and the second video frame are reduced by sub-sampling to a ¼ resolution of the original video frames, to detect two motion vector candidates;
    a second step of calculating, by the motion estimator of the video encoder, a sum (A) of absolute differences between a mean intensity of a 16×16 pixel macroblock of the current video frame and an intensity of each pixel of the macroblock, at the original video resolution; and
    if the sum A value calculated in the second step is smaller than a predetermined threshold value, then at least one of;
    a third step of performing, by the motion estimator of the video encoder, a partial search within a ±1 pixel search region for a 8×8 pixel macroblock, wherein the video data is reduced to ½ the resolution of the original video frames, to detect a motion vector candidate; and
    a fourth step of performing, by the motion estimator of the video encoder, a partial search within a ±1 search region for a 16×16 pixel macroblock in the original video resolution, to detect a final motion vector.

2. The method as claimed in claim 1, wherein the ±4 pixel search region is operatively divided into four ±2 pixel search regions, and wherein the full search within a ±4 pixel search region is performed by sequentially performing a full search within each of the four ±2 pixel search regions for the 4×4 pixel block.

3. The method as claimed in claim 1, further comprising:
comparing the sum (A) of the absolute differences between the mean intensity of the macroblock and the intensity of each pixel of the macroblock, with a predetermined reference value, to select an intermode or an intramode.

4. A motion estimation method of a video encoder, the method comprising:
performing, by a motion estimator of the video encoder, a full search within a ±4 pixel search region in a first video frame for a 4×4 pixel block of a second video frame,
wherein original video resolutions of the first video frame and the second video frame are reduced by sub-sampling to a ¼ resolution of the original video frames, to detect two motion vector candidates;
performing, by the motion estimator of the video encoder, a partial search within a ±1 pixel search region for a 8×8 macroblock of a current video frame data at ½ of the original video resolution, to detect a motion vector candidate, upon determining that a prediction result of an optimum candidate of the two motion vector candidates and a candidate having a spatial correlation with a neighboring block of the macroblock has no motion, and an intensity variation value of the macroblock is greater than a determined reference value.

5. A motion estimation method of a video encoder, the method comprising:
performing, by the motion estimator of the video encoder, a full search within a ±4 pixel search region in a first video frame for a 4×4 pixel block of a second video frame,
wherein original video resolutions of the first video frame and the second video frame are reduced by sub-sampling to a ¼ resolution of the original video frames, to detect two motion vector candidates;
performing, by the motion estimator of the video encoder, a partial search within a ±1 search region for a 16×16 pixel macroblock of current video frame data at the original video resolution, to detect a motion vector candidate, upon determining that a prediction result of an optimum candidate of the two motion vector candidate and a candidate having a spatial correlation with a neighboring block of the macroblock has no motion, and an intensity variation value of the macroblock is greater than a determined reference value.

* * * * *